Patented June 10, 1930

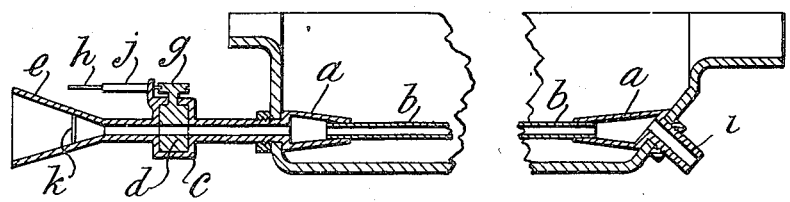
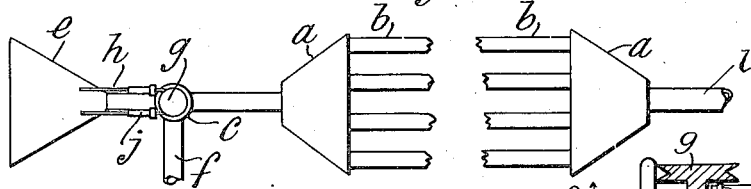
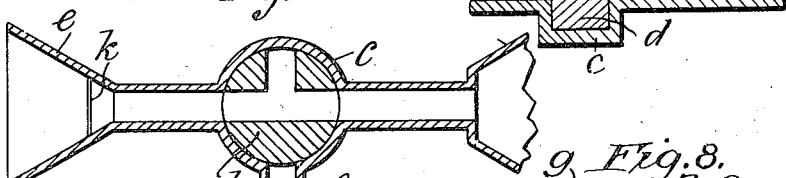
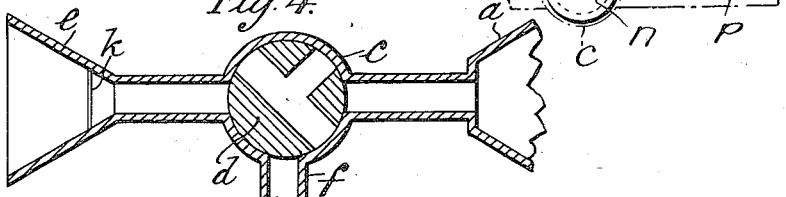
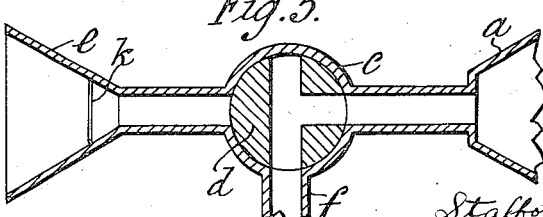
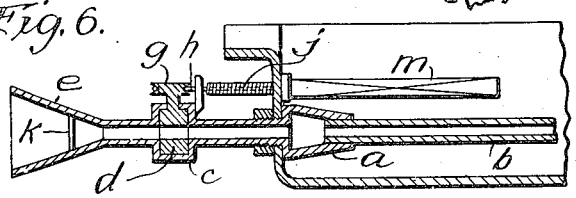

1,762,464

UNITED STATES PATENT OFFICE

STAFFORD CONWAY BELFIELD, OF TWICKENHAM, ENGLAND

APPARATUS FOR REGULATING THE TEMPERATURE OF THE OIL CONTAINED IN THE SUMPS OF INTERNAL-COMBUSTION ENGINES

Application filed July 6, 1929, Serial No. 376,442, and in Great Britain June 29, 1928.

This invention relates to an apparatus for regulating the temperature of the lubricating oil contained in the sump of an internal combustion engine.

The object of the invention is to provide an apparatus which will allow a uniform and constant temperature of the oil to be maintained under all working conditions. As is well known, in relatively cold weather, and after the engine has been stationary for some length of time, the oil is liable to become viscous, and tends to impair the efficiency of the engine, whereas on the other hand, after the engine has been running for a certain period, the oil is apt to exceed the desirable maximum temperature, thus losing its viscosity, and causing the engine to overheat.

The apparatus according to the present invention consists, broadly speaking, of a hollow member or heat transfer conduit which is located in the engine sump of an internal combustion engine, and which, by means of a three-way valve, operated either manually or automatically, allows passage of a heating or cooling agent through the hollow member which is immersed in the oil or, prevents the passage of the heating or cooling agent. The outer air, for example, may be employed as the cooling agent, whilst the exhaust gas from the engine may be used as the heating agent.

The invention is illustrated by way of example in the accompanying drawing, in which the same reference characters are employed in the different figures to denote the same parts.

Fig. 1 is a section showing the apparatus, built into the engine sump of an internal combustion engine.

Fig. 2 is a plan view of the apparatus.

Fig. 3 is a detail section to a larger scale of the three-way valve, showing the position of the said valve when the cooling agent is allowed to enter the apparatus.

Fig. 4 is a similar section of the three-way valve, showing the position of the said valve when both the cooling agent and the heating agent are prevented from entering the apparatus.

Fig. 5 is a similar section of the three-way valve, showing the position of the said valve when the heating agent is allowed to enter the apparatus.

Figure 6 is a fragmentary vertical sectional view of an engine sump, the oil temperature regulating apparatus attached thereto, and thermostatic means for automatically controlling the admission of heating and cooling agents to the apparatus.

Figure 7 is a vertical sectional view of a valve showing means for automatically returning the latter to its closed position when the valve controlling means breaks.

Figure 8 is a horizontal sectional view taken on the line 8—8 of Figure 7.

In the drawing, $a$ is the hollow member through which the heating or cooling agent is passed, and which may be composed of one piece, or furnished with thin tubes $b$, and constructed in flat, curved, or any other form as desired as found most convenient to fit in the sump. It will be observed that the hollow members $a$ and the intervening tubes $b$ together constitute a heat transfer conduit for cooling or heating the oil in the sump as desired. At the front of the apparatus is provided a valve $c$ in which a rotatable plug $d$ is mounted and in this example, is operated by the small wheel $g$, which, in turn, can be rotated by an inner flexible wire or cable $h$ sliding in an outer flexible sheathing $j$. In front of the valve $c$ is provided a funnel $e$ for more readly conducting the outer air serving as the cooling agent, through the hollow member $a$ and the pipes $b$. A gauze or other suitable filter $k$ may be inserted in funnel $e$ to prevent foreign matter from entering the apparatus. $f$ is a pipe leading to the side of the valve $c$ and to a suitable point in the exhaust system in the internal combustion engine, and serving to conduct the hot gases through the valve $c$ to the hollow member $a$ and pipes $b$.

$l$ is an outlet pipe communicating with the hollow member $a$ and a point exterior thereof. This outlet is located at the opposite end of the member $a$ from that to which the valve $c$ is connected, and serves as a means of egress for either the heating agent or the cooling agent, depending upon the position of the valve plug $d$.

In Fig. 3, the valve $c$ is shown with the plug $d$ in such a position that the cool air from the funnel $e$ is conducted to the conduit, while pipe $f$ is effectively sealed.

In Fig. 4, the plug $d$ of the valve $c$ is in such a position that both the cooling agent and the heating agent are effectively prevented from entering the conduit.

In Fig. 5, the plug $d$ of the valve $c$ is in such a position that the cooling agent from the funnel $e$ is effectively sealed from entering the conduit, whilst the heating agent from the pipe $f$ is conducted into the conduit.

Instead of operating the plug $d$ of the valve $c$ manually by means of the flexible wire $h$ in flexible sheathing $j$, or by means of rods connected through bell crank levers, it may be controlled automatically by means of thermostatic apparatus. Such an apparatus is illustrated in Figure 6 in which there is shown diagrammatically a thermostat $m$ to which is connected a Bowden wire $h$ mounted for sliding movements in a sheath $j$, the wire $h$ being connected to the valve operating wheel $g$. When the temperature of the oil in the engine sump is raised above a predetermined point the thermostat moves the valve $d$ through the medium of the Bowden wire $h$ to the position shown in Figure 3 in which position of the valve a cooling agent is admitted to the hollow member $a$. When the temperature of the oil drops below a predetermined value the thermostat moves the valve plug $d$ to the position shown in Figure 5 for admitting a heating agent to the hollow member. The inlet for the cooling medium should be situated preferably at the front of the apparatus when applied to internal combustion engines on automobiles or aircraft, and the like, so that there is an unrestricted flow of cool air right through the apparatus. In the case either of a manually or automatically operated valve, provision may be made in which, should the controlling mechanism cease to function the valve will automatically return to any selected position, preferably the "off" position as shown in Fig. 4, as it is found that this position will in general be most used and will prevent any damage being caused to the working parts of the engine. A means for effecting this automatic movement of the valve to its closed positon in case the controlling mechanism ceases to function is illustrated in Figures 7 and 8 in which it will be seen the valve operating wheel $g$ is provided on its lower face with two downwardly extending pins $n$, $n$ between which is positioned the free end of a leaf spring $o$ attached at its other end to a lug $p$. It will be seen that the spring $o$ tends to move the valve plug $d$ to the position shown in Figures 4, 7 and 8, in which position the valve plug cuts off communication between the hollow member $a$ and the funnel $e$ and pipe $f$ respectively. If the valve plug is in either of the positions shown in Figures 3 or 5 and the Bowden wire $h$, or other part of the controlling apparatus ceases to function, the spring $o$ will return the valve to the position shown in Figures 4, 7 and 8. When the control is effected manually, the necessary control mechanism will be mounted at a suitable point within easy access, for example, in the case of an automobile or aircraft on the dashboard, and a thermometer or other means for indicating the temperature of the oil in the sump may be provided so that the dial of the instrument will preferably be adjacent to the control. If the regulation is effected automatically, the provision of a thermometer is also desirable in order that the operator may observe if the thermostat is functioning correctly.

The apparatus may be composed of metal, for example copper, or any other suitable material, and it is not essential that it shall take the particular form herein described, and again, it is not essential that the valve shall be of the rotating type as described, provided some method is employed for allowing either the heating or the cooling agent to enter the apparatus, and for shutting them off.

It is, of course, distinctly understood that I do not restrict myself to the particular form of embodiment shown, but that various other forms may be employed without departing from the spirit of the invention.

What I claim is:—

1. An apparatus for regulating the temperature of the lubricating oil contained in the sump of an internal combustion engine comprising a heat transfer conduit located in said sump and immersed in the oil, air inlet means arranged to communicate with the outer air and adapted to be connected to said conduit for admitting air thereto, exhaust gas inlet means arranged to communicate with the engine exhaust and adapted to be connected to said conduit for admitting hot exhaust gases thereto, and a valve interposed between the respective inlet means and said conduit and adapted to place said conduit in communication with either of said inlet means and also adapted to close communication between said conduit and both of said inlet means simultaneously.

2. An apparatus according to claim 1 in which valve actuating means responsive to the temperature of the oil in the sump and operatively connected to said valve are provided for automatically actuating the valve.

3. An apparatus according to claim 1 including valve actuating means operatively connected to said valve and means associated with the valve and constantly urging the latter to a cut-off position for automatically closing said valve when said actuating means breaks.

In testimony that I claim the foregoing as my invention I have signed my name this 28th day of June, 1929.

STAFFORD CONWAY BELFIELD.